(12) United States Patent
Kluser

(10) Patent No.: US 6,755,561 B2
(45) Date of Patent: Jun. 29, 2004

(54) ONE PIECE ELASTOMER KEYPAD WITH INTEGRAL LIGHT PIPE

(75) Inventor: Robert D. Kluser, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/989,971

(22) Filed: Nov. 20, 2001

(65) Prior Publication Data

US 2002/0126469 A1 Sep. 12, 2002

Related U.S. Application Data

(60) Provisional application No. 60/260,488, filed on Jan. 8, 2001.

(51) Int. Cl.[7] .............................................. G09F 13/00
(52) U.S. Cl. ......................... 362/551; 362/29; 362/153
(58) Field of Search ........................ 362/29, 23, 551, 362/153, 545; 200/314, 315

(56) References Cited

U.S. PATENT DOCUMENTS 5,971,761 A * 10/1999 Tillman, Sr. ................. 434/81

* cited by examiner

Primary Examiner—Sandra O'Shea
Assistant Examiner—Guiyoung Lee
(74) Attorney, Agent, or Firm—Thomas F. Lenihan

(57) ABSTRACT

An elastomeric mat is formed by extruding transparent or translucent elastomeric material. Columns made of the same material guide light from an LED source directly to a light port on top of the column, and diffuse the light substantially throughout the column. A coating of opaque material is used to surround the length of the columns to prevent leakage of light. When mounted adjacent to a front panel, off-axis performance is substantially increased over the prior art by, in effect, bringing the light-emitting source adjacent to a clear port of the front panel. The columns of translucent or transparent elastomeric material function as light pipes, and are formed when making the eleastomeric mat. The columns may be cylindrical or rectangular. Either a rectangular or a cylindrical column of translucent or transparent elastomeric material can convey light to illuminate a legend printed directly on top of the column.

12 Claims, 5 Drawing Sheets

ONE PIECE ELASTOMER KEYPAD WITH INTEGRAL LIGHT PIPE

This application claim benefit to provisional application No. 60/260,488 Jan. 8, 2001.

FIELD OF THE INVENTION

The subject invention generally concerns the field of elastomer mats having raised key pads formed thereon, and specifically concerns elastomer mats that guide light from light emitting diodes to illuminate a front panel.

BACKGROUND OF THE INVENTION

In modern test and measurement equipment, it is commonplace to employ light emitting diodes (LEDs) to illuminate legends printed on a Lexan® panel attached to a front panel. In such an arrangement, the LEDs are placed on an electronic circuit board (ECB) mounted behind, and parallel to, the front panel. An elastomeric mat having raised key pads formed thereon, is arranged between the ECB and the front panel. The front panel includes holes for allowing the raised keypads to protrude beyond the outer surface of the front panel for activation by a user.

When the LEDs are mounted on the rear side of the ECB, the ECB includes holes that enable light from the LEDs to travel toward the front panel. The elastomeric mat also has a hole in line with each LED to allow the light to pass unimpeded toward the front panel. The front panel also has a hole formed therein to allow the light to pass through a clear portion of the Lexan® panel.

Hollow tubes of opaque elastomeric material are formed on the mat in a substantially co-axial relationship surrounding the individual LEDs to prevent light from escaping and illuminating neighboring legends. Unfortunately, the off-axis viewing performance of this arrangement is not satisfactory because the source of the light is at the bottom of the tube, and light rays that emerge are confined to a relatively small conical area. Moreover, the off-axis viewing performance degrades even more as the tube is made longer.

One might think that using a discrete plastic light pipe at each LED would be a solution to the problem of unacceptable off-axis viewing performance. However, the discrete plastic light pipe solution does not present an attractive manufacturing solution in terms of extra components to purchase and store that require hand installation during assembly of a front panels. What is needed is a solution that improves off-axis viewing performance, but does not require extra hand-installation manufacturing steps.

SUMMARY OF THE INVENTION

An elastomeric mat is formed by extruding transparent or translucent elastomeric material into a desired shape. Columns made of the same material guide light from an LED source directly to a light port on top of the column, and diffuse the light substantially throughout the column. A coating of opaque material is used to surround the length of the columns to prevent leakage of light. When mounted adjacent to a front panel, off-axis performance is substantially increased over the prior art by, in effect, bringing the light-emitting source adjacent to a clear port of the front panel. The columns of translucent or transparent elastomeric material function as light pipes, and are formed when making the eleastomeric mat. In a further embodiment of the invention, the columns may be cylindrical or rectangular. Either a rectangular or a cylindrical column of translucent or transparent elastomeric material can convey light to illuminate a legend printed directly on top of the column.

DETAILED DESCRIPTION OF THE DRAWING

Figure 1:
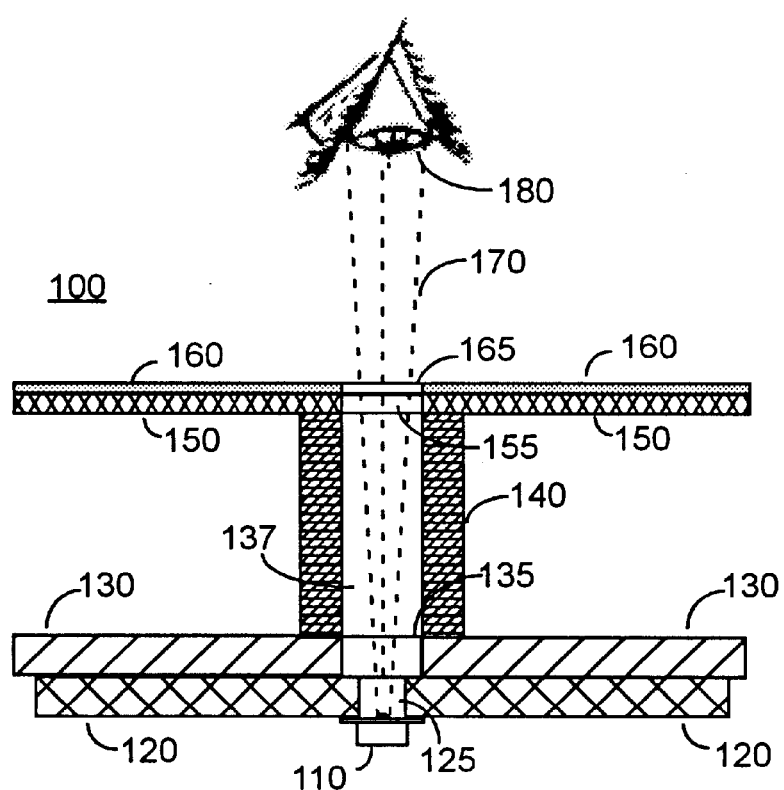
FIG. 1 shows a section view of an elastomeric mat according to the prior art.

FIG. 1 shows a section view of a panel illumination arrangement 100, as known from the prior art. An LED 110 is mounted on the rear side of an ECB 120. ECB 120 has a hole 125 formed through it to allow light to pass through from LED 110. An elastomeric mat 130 is in contact with the front side of ECB 120. The material of elastomeric mat 130 is well-known in the art and is available, for example, as KE-951 (silicon rubber 50±5 durometer) manufactured by Shin-Etsu Polymer America, Inc., Alpharetta, Ga. Elastomeric mat 130 also has a hole 135 formed through it for allowing the passage of light from LED 110 into an interior chamber 137 of a hollow tube 140 formed of opaque elastomeric material. The opaque elastomeric material shield neighboring legends from stray light from LED 110. The top surface of hollow tube 140 contacts the rear surface of a front panel 150. A thin Lexan® panel (or the like) 160 having legends printed thereon is affixed to the front surface of front panel 150. Lexan® panel 160 has a clear light port 165 that is placed directly over a hole 155 formed through front panel 150, so that light from within the interior chamber of hollow tube 140 can emerge and illuminate the front panel legends. An eye 180 of an observer, notes that the light rays 170 from LED 110 appear bright when viewed directly on-axis, but dims markedly as the observer moves off-axis (or as the hollow tube is made longer). The cause of the poor off-axis performance is the placement of LED 110 at the bottom of the hollow tube. The only light rays emerging from clear port 165 are those in a conical arrangement having a somewhat shallow angle.

Figure 2:
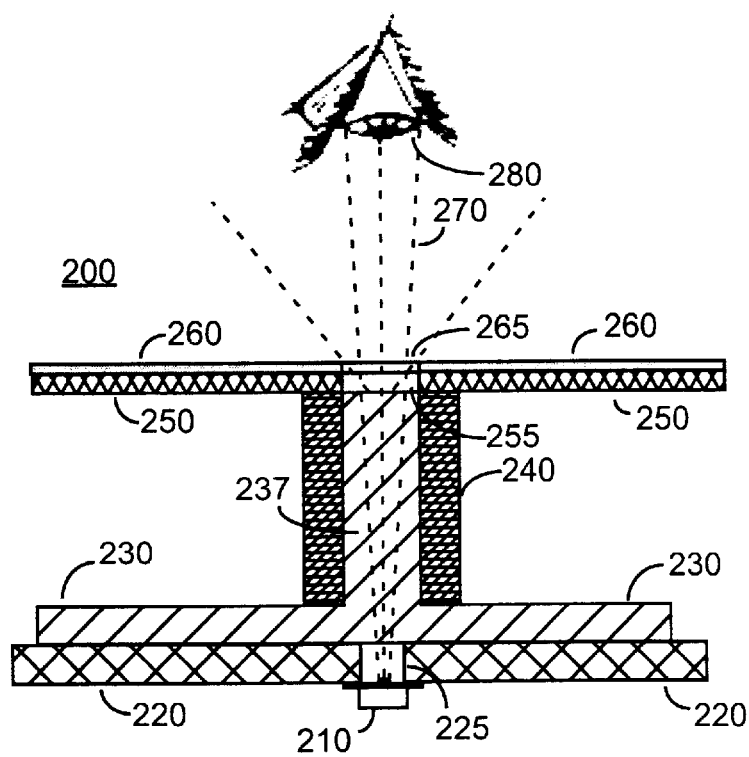
FIG. 2 shows a section view of an elastomeric mat according to a first embodiment of the subject invention.

FIG. 2 shows a first embodiment of the subject invention in which elements having similar reference numerals to those of FIG. 1 serve the same purpose. FIG. 2 shows a section view of a panel illumination arrangement 200, according to the subject invention. An LED 210 is mounted on the rear side of an ECB 220. ECB 220 has a hole 225 formed through it to allow light to pass through from LED 210. An elastomeric mat 230 is in contact with the front side of ECB 220. Elastomeric mat 230 includes a column of translucent or transparent elastomeric material for guiding the passage of light from an entry point substantially in-line with LED 210 to the top surface of the column of elastomeric material 237. A tube or coating 240 of opaque elastomeric material surrounds column 237. The top surface of tube 240 contacts the rear surface of a front panel 250. A thin Lexan® panel 260 having legends printed thereon is affixed to the front surface of front panel 250. Lexan® panel 260 has a clear light port 265 that is placed directly over a hole 255 formed through front panel 250, so that light from the upper end of column 237 can emerge and illuminate the front panel legends. An eye 280 of an observer, notes that the light rays 270 from LED 210 appear bright when viewed directly on-axis, and notes some improvement in off-axis performance over the prior art. The cause of the less than optimum off-axis performance is the placement of the top of column 237 at the rear side of the front panel. This placement creates a dead air space within the hole 255 formed in the front panel. The light rays emerging from clear port 265 are those in a conical arrangement having a somewhat wider angle than exhibited by the arrangement of FIG. 1.

Figure 3:
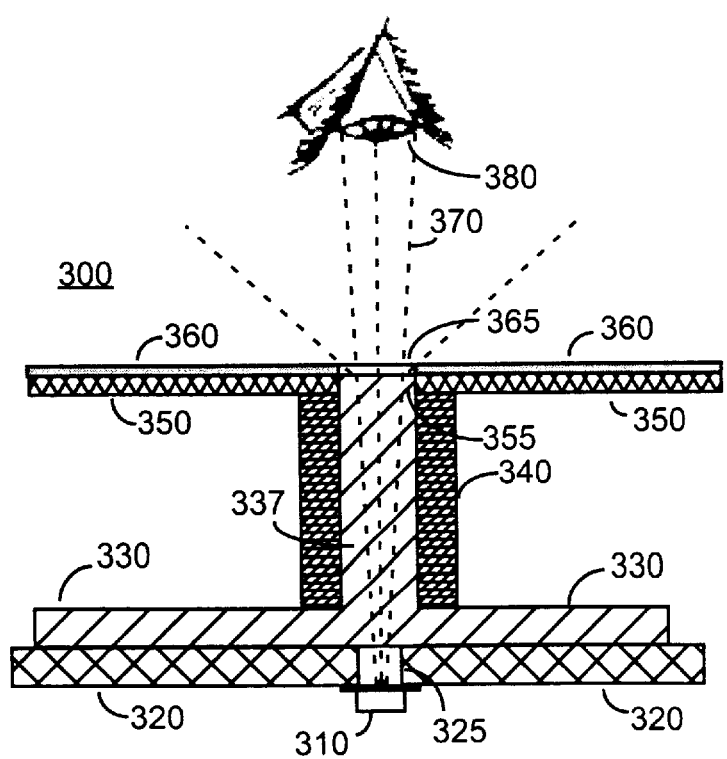
FIG. 3 shows a section view of an elastomeric mat according to a second embodiment of the subject invention.

FIG. 3 shows a second embodiment of the subject invention in which elements having similar reference numerals to those of FIG. 2 serve the same purpose, and need not be described again. The only difference between the arrangements of FIGS. 2 and 3 is that in FIG. 3 the column of translucent or transparent material 337 extends through hole 355 of front panel 350. This brings the light emitting top surface of column 337 immediately adjacent to clear port 365 of Lexan® panel 360, and provides a greater viewing angle to the eye 380 of an observer.

Figure 4:
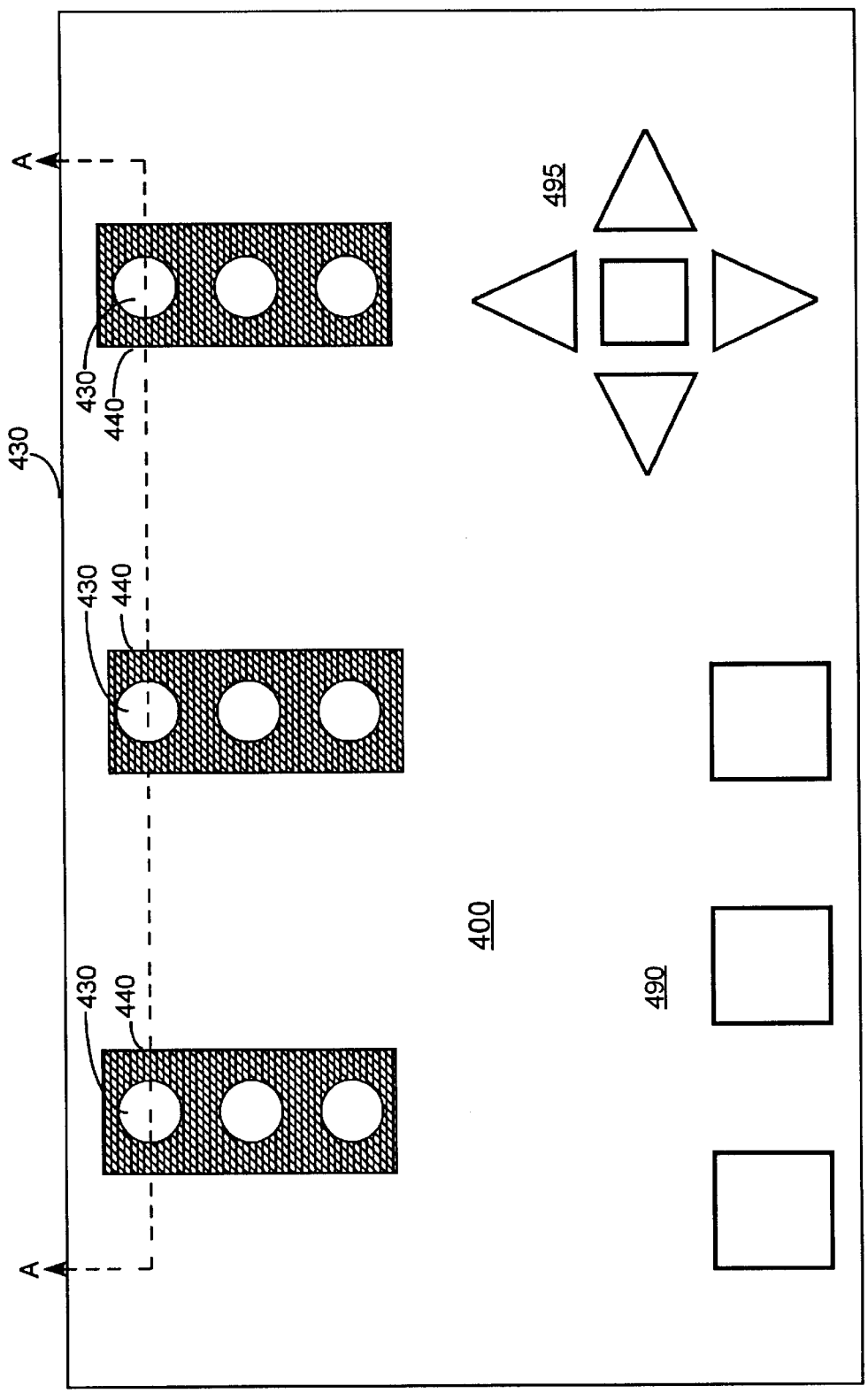
FIG. 4 shows a plan view of an elastomeric according to the subject invention.

FIG. 4 shows a plan view of an elastomeric mat generally designated 400. The entire mat is composed of translucent or transparent elastomeric material 430, except for rectangular solids 440, 440' and 440", which are formed of opaque elastomeric material. Rectangular solids 440, 440' and 440" include a trio of columns of translucent or transparent material 430, the same material that the majority of the elastomeric mat is made from. Elastomeric mat 400 also includes an array of pushbuttons 490 and a directional array of pushbuttons 495, the purposes of which are not germane to the subject invention. Rectangular solids 440, 440' and 440" are divided by a section line A—A. Section A—A is shown in FIG. 5.

Figure 5:
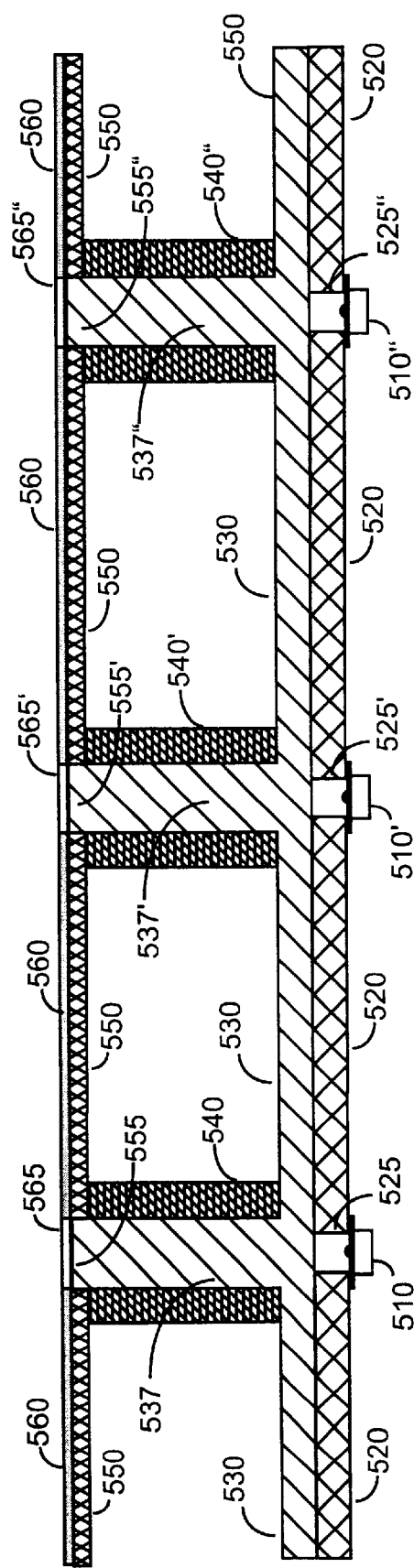
FIG. 5 shows a section view of the elastomeric mat of FIG. 4.

FIG. 5 shows three units of the kind explained above with respect to FIG. 3. FIG. 5 shows the purpose of opaque layers 540, 540', and 540" in preventing leakage of light from column 537' to adjacent columns 537 and 537". It is envisioned that LEDs 510, 510' and 510" can be mounted on the front surface of ECB 520 if recesses (not shown) were formed in the bottom of elastomeric mat 530 to receive the bodies of the LEDs.

Figure 6A:
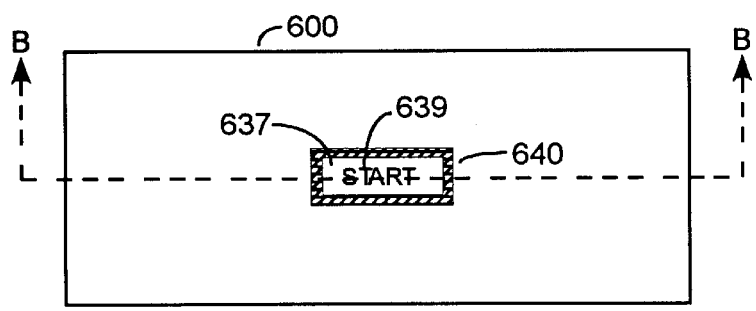
FIG. 6 shows a third embodiment of the invention employing an elliptical column of translucent or transparent material.
Figure 6B:
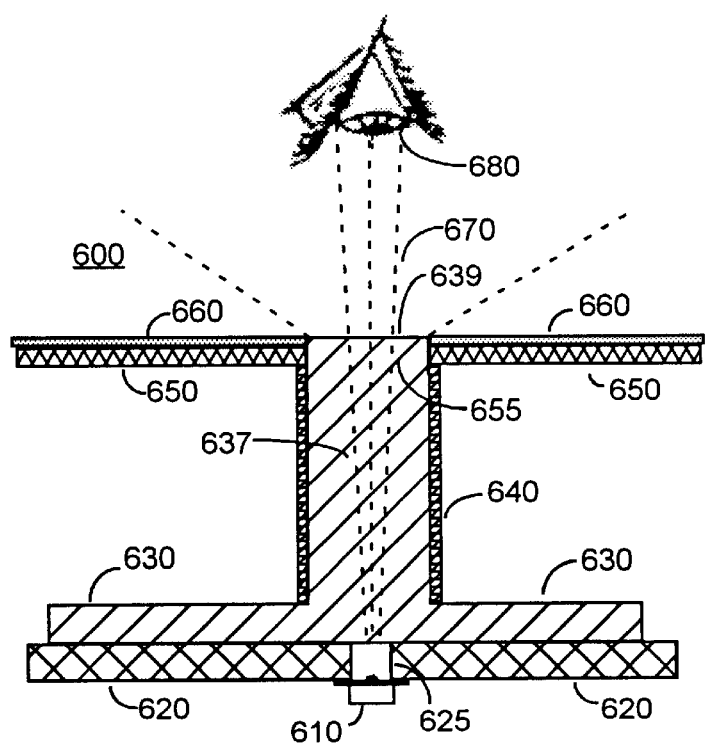

When attempting to illuminate a legend on a button, the prior art has resorted to using two LEDs to get enough light to illuminate the entire surface. The use of two LEDs worked to some extent, but produced "hot spots" due to uneven illumination of the entire surface. FIGS. 6A and 6B show a solution to this problem.

FIG. 6A shows a plan view of an elastomeric mat and panel assembly generally designated 600. The entire mat is composed of translucent or transparent elastomeric material 630, except for a coating 640 of opaque elastomeric material formed around the perimeter of a rectangular column 637. Rectangular column 637 is also formed of translucent or transparent elastomeric material for conveying light from below. A legend START is printed on a substantially flat upper surface of transparent or translucent rectangular column 637. Elastomeric mat and panel assembly 600 is divided by a section line B—B. Section B—B is shown in FIG. 6B.

The cross section of FIG. 6B is similar to the cross section shown in FIG. 3. However, there are significant differences between the two. In FIG. 6B, there is no clear port in Lexan® panel 660. Instead, the top of elastomeric column 637 is substantially flush with the surface of Lexan® panel 660, and legend 639 is printed on top of column 637. This arrangement takes advantage of a light-diffusion property of the translucent or transparent elastomeric material. That is, light emanating from LED 610 is diffused substantially throughout column 637, thus eliminating the undesired "hot spots" of the prior art. LED 610 can be mounted on the front surface of ECB 620 if a recess (not shown) were formed in the bottom of elastomeric mat 630 to receive the body of LED 610.

What has been described is a solution to the problem of piping light from an LED to a front panel where the front panel employs an elastomeric mat for switching purposes. The described solution provides a relatively large viewing angle (good off-axis viewing performance), and at the same time, does not require additional parts or assembly steps.

While the invention was described as being used in test and measurement instruments, that was by way of example and no such limitation is intended.

Advantageously, on an assembly line, apparatus according to the embodiments of FIGS. 2 and 3 may be substituted for the prior art arrangement of FIG. 1 with no impact on manufacturing procedures.

One skilled in the art will realize that any other light source (incandescent bulbs, etc.) can be substituted for the LEDs without departing from the principles of the invention.

What is claimed is:

1. An elastomeric mat, comprising:
    a body composed of elastomeric material;
    a column of translucent elastomeric material formed on said elastomeric mat, said column being substantially perpendicular to a plane of said elastomeric mat; and
    an entry port for receiving light from a light source, said entry port being an end of said column in contact with said plane of said elastomeric mat;
    said column having a second end, said second end being an exit port for said light;
    said column conveying said light from said entry port to said exit port.

2. The elastomeric mat of claim 1 wherein said elastomeric material forming said body of said elastomeric mat is translucent elastomeric material.

3. The elastomeric mat of claim 2 wherein a coating of opaque elastomeric material is formed on a longitudinal outside surface of said column.

4. The elastomeric mat of claim 3 wherein said column has a legend printed on said second end.

5. An elastomeric mat, comprising:
    a body composed of elastomeric material;
    a column of transparent elastomeric material formed on said elastomeric mat, said column being substantially perpendicular to a plane of said elastomeric mat; and
    an entry port for receiving light from a light source, said entry port being an end of said column in contact with said plane of said elastomeric mat;
    said column having a second end, said second end being an exit port for said light;
    said column conveying said light from said entry port to said exit port.

6. The elastomeric mat of claim 5 wherein said elastomeric material forming said body of said elastomeric mat is transparent elastomeric material.

7. The elastomeric mat of claim 6 wherein a coating of opaque elastomeric material is formed on a longitudinal outside surface of said column.

8. The elastomeric mat of claim 6 wherein said column has a legend printed on said second end.

9. A front panel assembly, comprising:

a front panel having first apertures formed therein for receiving user-operable controls and second apertures formed therein for providing a light path for illumination of legends; and an elastomeric mat, including:

a body composed of elastomeric material;

a column of translucent elastomeric material formed on said elastomeric mat, said column being substantially perpendicular to a plane of said elastomeric mat; and an entry port for receiving light from a light source, said entry port being an end of said column in contact with said plane of said elastomeric mat;

said column having a second end, said second end being an exit port for said light;

said column conveying said light from said entry port to said exit port;

said second apertures being substantially aligned with said second end of said column.

10. The front panel assembly of claim 9, further including:

a light-transmissive panel, affixed to said front panel and having legends printed thereon and positioned for illumination by said conveyed light.

11. A front panel assembly, comprising:

a front panel having first apertures formed therein for receiving user-operable controls and second apertures formed therein for providing a light path for illumination of legends; and an elastomeric mat, including:

a body composed of elastomeric material;

a column of transparent elastomeric material formed on said elastomeric mat, said column being substantially perpendicular to a plane of said elastomeric mat; and an entry port for receiving light from a light source, said entry port being an end of said column in contact with said plane of said elastomeric mat;

said column having a second end, said second end being an exit port for said light;

said column conveying said light from said entry port to said exit port;

said second apertures being substantially aligned with said second end of said column.

12. The front panel assembly of claim 11, further including:

a light-transmissive panel, affixed to said front panel and having legends printed thereon and positioned for illumination by said conveyed light.

* * * * *